J. HOWELL.
Baling Press.

No. 212,227. Patented Feb. 11, 1879.

Witnesses.
W. N. H. Knight
Wm. Blackstock

Inventor.
John Howell,
By L. Hill
His atty.

UNITED STATES PATENT OFFICE.

JOHN HOWELL, OF SACRAMENTO, CALIFORNIA, ASSIGNOR TO PETER K. DEDERICK, OF ALBANY, NEW YORK.

IMPROVEMENT IN BALING-PRESSES.

Specification forming part of Letters Patent No. 212,227, dated February 11, 1879; application filed June 15, 1878.

*To all whom it may concern:*

Be it known that I, JOHN HOWELL, of the city and county of Sacramento, and State of California, have invented an Improved Method of Wiring or Roping Bales of Hay, Cotton, &c., of which the following is a specification:

My invention is particularly applicable to continuous presses; and consists in passing the bight of the wire through the press, cutting the same, and using the one end to secure a bale at the left, and the other end to secure a bale at the right, thereby greatly facilitating the operation.

In order that my invention may be more clearly understood, I will state that in all methods of binding bales heretofore the ends of the wires or ties are passed through the press and thus passed around the bale and secured.

In the Dederick press, to which my invention is shown as applied, the hay is fed into a hopper, passing thence into a long horizontal box, whence it is compressed by means of a reciprocating piston.

Referring to the accompanying drawings for a more complete explanation of my invention, the figures show the box of a baling-press, through which the hay is forced from the end, and is sufficiently compressed to form a bale by the action of a piston, which has a reciprocating motion and compresses each new charge of hay as it is introduced, the box being long enough to hold about two or two and one-half bales, and being also somewhat contracted at its discharge end. The friction of the hay against the sides will be sufficient to retard and hold the hay until compressed as much as may be necessary to form a bale.

Figure 1:
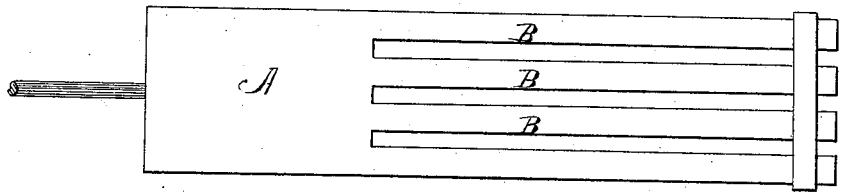
Figure 2:
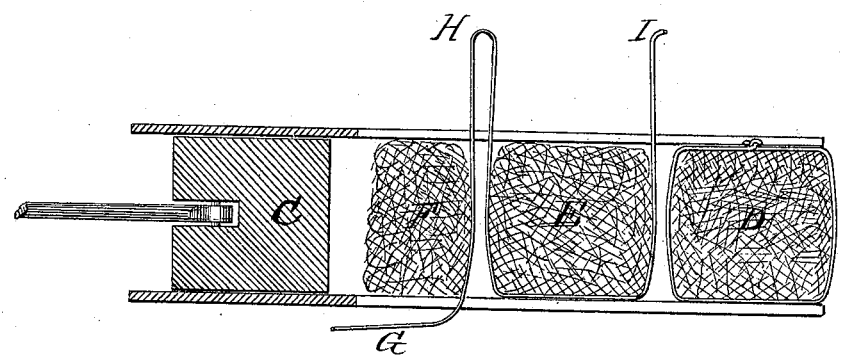
Figure 3:
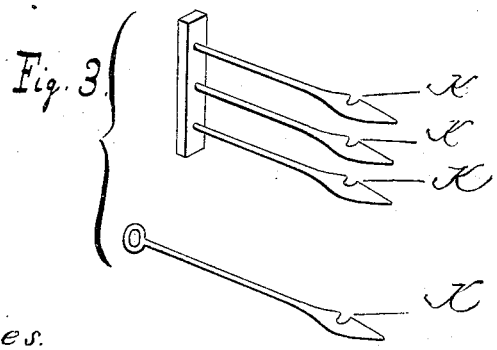

Figure 1 is a side view of a baling-press. Fig. 2 is a horizontal section, showing the manner of tying off the bales. Fig. 3 illustrates an instrument for passing binding material.

Similar letters of reference in the several figures denote the same parts.

A is the side of the press. B B are tying-slots. C is the traverser or piston. F is the forming bale; E, the finished bale; D, the bale being discharged. G is the binding material.

After the bight of the binding material G is passed through the press, as shown at H, the same is cut, as shown at I, the one end securing the bale D, and the other end secured to one of the ends formed by cutting H and around the bale E, thus securing the latter.

The operation is thus continued, and the bale F, when a sufficient column of hay is formed, is, in a like manner, secured by the remaining end H being attached to one of the ends formed from cutting another bight passed through the press. Any suitable manner of passing the bight of the binding material may be employed, and I describe one way as follows:

Fig. 3 illustrates a strong needle, similar to that patented by said Dederick with his press, and made with one end of such form as to easily penetrate the mass of hay in the box; and this needle has a slot or notch, K, made in it, preferably near its front end, so that the bight of the baling-wire will be held in this notch and carried through the hay with the needle, which is passed through the slots B; and, in practice, I either pass the bight of each wire through separately, or I fix a number of needles equal to the number of baling-wires to a bar, so that they project in the same direction and can all be forced through at once.

Having thus fully described my invention, what I claim, and desire to secure by Letters Patent, is—

The method of successively wiring or roping bales of hay, cotton, &c., by passing the bight of the binding material through the press at suitable intervals to separate the hay or cotton into bales, cutting the same, and using the one end thus formed to secure the finished bale, and the other end to secure the forming or succeeding bale, as set forth.

In witness whereof I have hereunto set my hand.

JOHN HOWELL.

Witnesses:
GEO. H. STRONG,
OLWYN T. STACY.